(12) United States Patent
Tavli et al.

(10) Patent No.: US 7,764,706 B2
(45) Date of Patent: Jul. 27, 2010

(54) TIME RESERVATION USING ADAPTIVE CONTROL FOR ENERGY EFFICIENCY

(75) Inventors: Bulent Tavli, Rochester, NY (US); Wendi Heinzelman, Pittsford, NY (US)

(73) Assignee: University of Rochester, Rochester, NY (US)

( * ) Notice: Subject to any disclaimer, the term of this patent is extended or adjusted under 35 U.S.C. 154(b) by 2039 days.

(21) Appl. No.: 10/393,885

(22) Filed: Mar. 20, 2003

(65) Prior Publication Data

US 2004/0184477 A1    Sep. 23, 2004

(51) Int. Cl.
  *H04B 7/212* (2006.01)
(52) U.S. Cl. ................... 370/444; 370/450; 370/459; 370/461; 370/462
(58) Field of Classification Search ............ 370/442, 370/443, 444, 449, 450, 457, 458, 459, 461, 370/462
See application file for complete search history.

(56) References Cited

U.S. PATENT DOCUMENTS

| | | | |
|---|---|---|---|
| 4,593,282 A | | 6/1986 | Acampora et al. |
| 5,384,777 A | | 1/1995 | Ahmadi et al. |
| 5,497,504 A | | 3/1996 | Acampora et al. |
| 5,515,379 A | * | 5/1996 | Crisler et al. ............... 370/347 |
| 5,613,198 A | | 3/1997 | Ahmadi et al. |
| 5,761,430 A | * | 6/1998 | Gross et al. ................. 709/225 |
| 5,850,592 A | | 12/1998 | Ramanathan |
| 5,930,246 A | * | 7/1999 | Akutsu ....................... 370/337 |
| 5,974,236 A | | 10/1999 | Sherman |
| 6,031,827 A | * | 2/2000 | Rikkinen et al. ............ 370/330 |
| 6,192,230 B1 | | 2/2001 | van Bokhorst et al. |
| 6,438,136 B1 | * | 8/2002 | Bahl .......................... 370/458 |
| 6,493,334 B1 | * | 12/2002 | Krzymien et al. ........... 370/342 |
| 6,498,785 B1 | * | 12/2002 | Derryberry et al. ......... 370/311 |
| 6,590,872 B1 | * | 7/2003 | Shiue et al. ................. 370/314 |
| 6,788,937 B1 | * | 9/2004 | Willenegger et al. ........ 455/434 |
| 2002/0018448 A1 | | 2/2002 | Amis et al. |
| 2002/0169846 A1 | | 11/2002 | Chen et al. |

FOREIGN PATENT DOCUMENTS

WO    WO 01/45437 A1    6/2001

OTHER PUBLICATIONS

Qiu et al., Dynamic Reservation Multiple Access (DRMA): A new multiple access scheme for Personal Communication System (PCS), 1996, Communication Sciences Institue, Department of Electrical Engieering, Univeristy of Southern California, pp. 117-128.*
Hanzo et al., A Packet Reservation Multiple Acces Assisted Cordless Telecommunication Scheme, 1994, IEEE Transactions onvehicular technoogy, vol. 43, No. 2, pp. 234-244.*

* cited by examiner

*Primary Examiner*—Jayanti K Patel
*Assistant Examiner*—Bo Hui A Zhu
(74) *Attorney, Agent, or Firm*—Blank Rome LLP

(57) ABSTRACT

A network, such as a radio network, uses dynamic transmission scheduling and soft clustering. When nodes contend for data slots, each node that is successful continues to have its data slot reserved for it until it sets an end-of-stream bit in an information summarization packet, indicating that it will stop broadcasting. From the information summarization packets, each node determines the other nodes to which it will listen, based on proximity and information content.

5 Claims, 8 Drawing Sheets

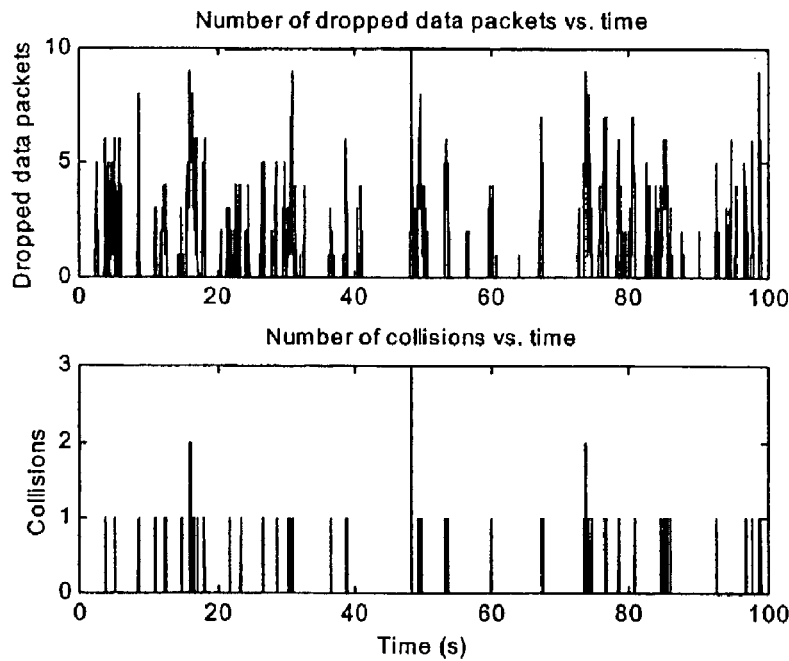
Fig. 5A
Fig. 5B
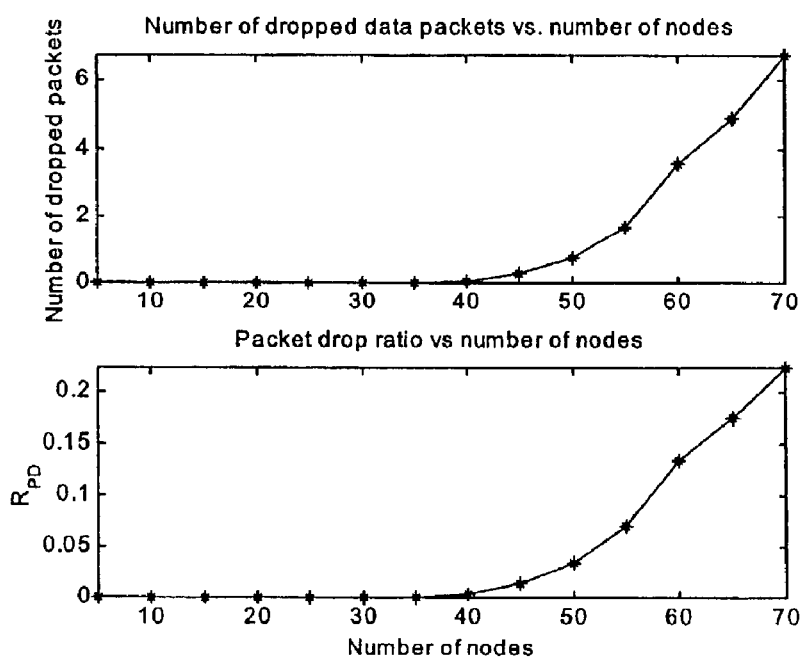
Fig. 6A
Fig. 6B

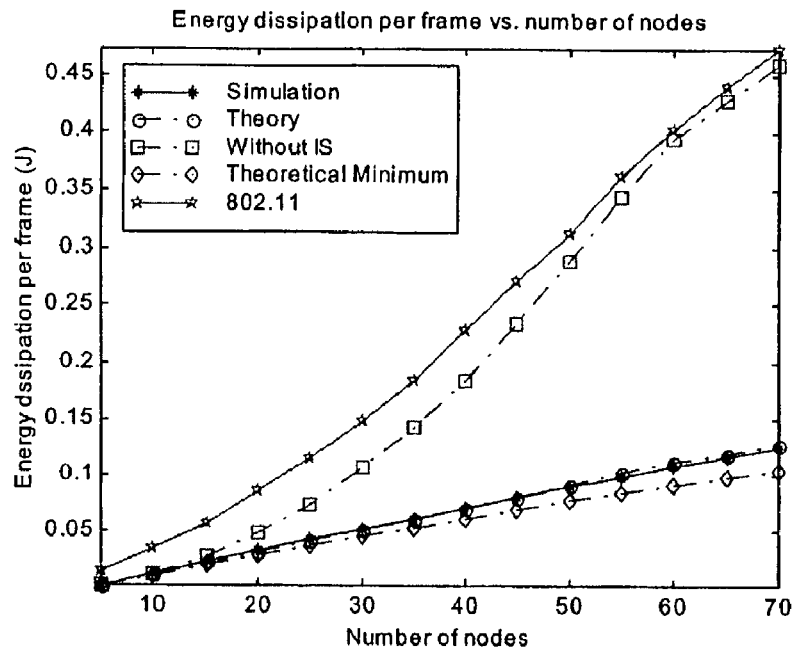
Figure 7.
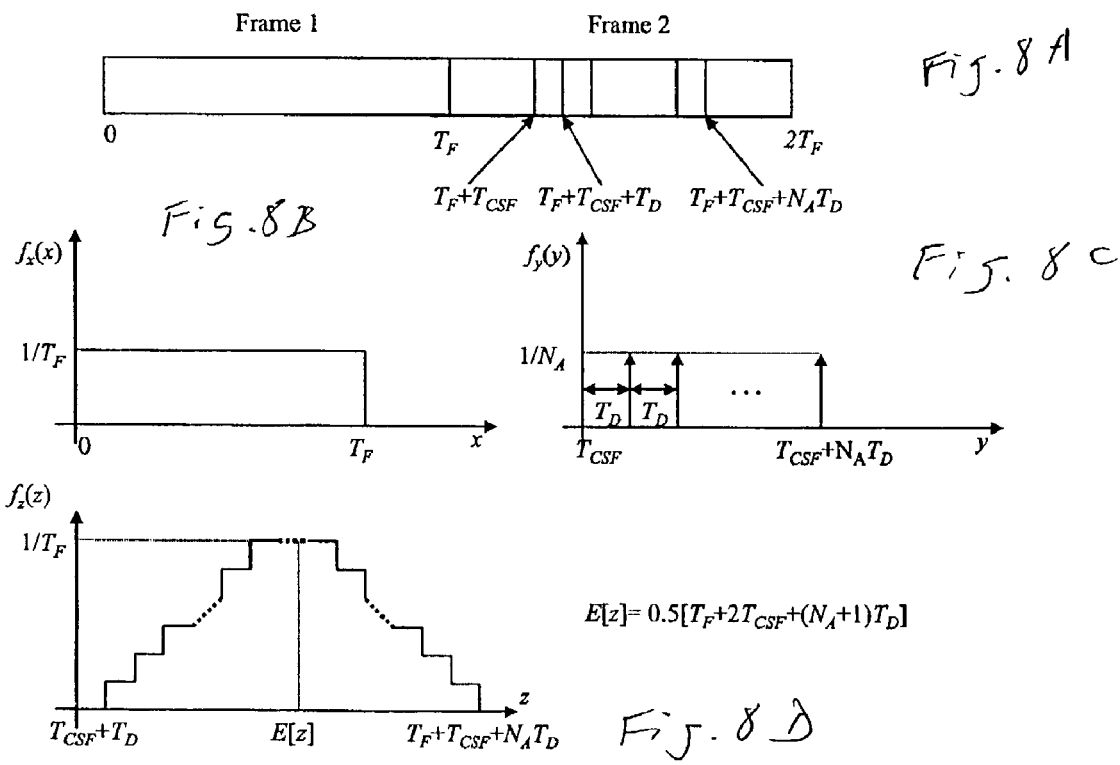

TIME RESERVATION USING ADAPTIVE CONTROL FOR ENERGY EFFICIENCY

FIELD OF THE INVENTION

The present invention is directed to a method and system for time reservation in networks, such as radio networks, and is more particularly directed to a method and system using dynamic transmission scheduling.

DESCRIPTION OF RELATED ART

In a wireless radio network, the transmission medium is common to all radios, and the MAC protocol controls access to this shared medium. The objective of controlled access is to avoid simultaneous transmission attempts (that will result in collisions) while maintaining the maximal throughput, minimal energy, and bounded packet delay of the whole network.

MAC protocols can be classified into two main categories: centralized and distributed. In a distributed MAC protocol, radios communicate without a central controller or base station. In other words, every radio should create its own access to the medium through a predetermined set of rules (e.g., IEEE 802.11). A centralized MAC protocol, on the other hand, has a controller node or a base station that is the maestro of the network (e.g., Bluetooth). All the nodes in the network access the medium through some kind of schedule determined by the controller.

Although distributed MAC protocols are deemed as the best existing solutions for multi-hop networks, they are not favorable in single-hop networks because they do not perform as well as centralized MAC protocols in single hop networks. In addition, centralized MAC protocols are generally more deterministic than distributed MAC protocols, which is a desirable feature for real-time traffic with delay constraints. As a result, it is advantageous to use a centralized MAC protocol in a single hop network that supports real-time traffic delivery. For example, in an IEEE 802.11 network, all nodes should be active all the time, because they do not know when the next transmission is going to take place. However, in a Bluetooth network, nodes can enter sleep mode frequently due to the explicit polling of the slave nodes by the master node, which is an effective method to save power. Moreover, the IEEE 802.11 protocol cannot guarantee bandwidth or delay constraints or fair medium access. In fact, all of these parameters are functions of the data traffic, and they become unpredictable and often unacceptable at high data rates. However, some centralized algorithms can guarantee some of the above requirements within certain ranges by making use of coordination via scheduling.

A centralized MAC protocol can work with TDMA, FDMA, CDMA or hybrid physical layers. Among them, TDMA is the most appropriate choice for power savings because radios can go to sleep mode whenever they are not involved with data transmission/reception. In a centralized TDMA type MAC protocol, the two most important issues are the controller assignment and the data transmission schedule, which correspond to the coordinator and the coordination, respectively. The coordinator could be a fixed predetermined radio, which is the sole controller for the entire network lifetime. The main drawback of this approach is that whenever the controller dies, the whole network also dies. The controller dissipates more energy than other nodes because of its additional processes and transmissions/receptions. Because of this higher energy dissipation, most possibly the controller will run out of energy before all the other nodes, leaving the entire network inoperable for the rest of the network lifetime, even though many other remaining nodes have enough energy to carry on transmissions/receptions. The data transmission schedule could also be fixed, but this does not allow the system to adapt to dynamic environments such as nodes entering the network. The alternative approach to a fixed controller and schedule is dynamic coordinator switching and schedule updating, which is a remedy for the problems described above. However, this approach comes with its own problems: overhead in controller handover and increased overhead in the schedule updates.

The information content in a broadcast medium may be higher than the usable range of a single node, in which case the nodes should select to receive only certain data packets. The straightforward approach, which is listening to all data transmissions, keeping the ones desired, and discarding the others, is a highly inefficient way of discriminating data.

SUMMARY OF THE INVENTION

It will be apparent from the above that a need exists in the art to overcome the above-noted problems. It is therefore an object of the invention to provide an energy-efficient technique for dynamic transmission scheduling.

It is another object of the invention to provide such a technique that remains functional if the controller fails.

It is still another object of the invention to provide an energy-efficient technique for selective listening on a network.

To achieve the above and other objects, the present invention is directed to a MAC protocol called TRACE (Time Reservation using Adaptive Control for Energy Efficiency). TRACE uses dynamic coordinator switching and schedule updating to adapt to a changing environment and reduce energy dissipation in the nodes. Other features of TRACE, such as information summarization, data stream continuation monitoring, multi-level coordinator backup, priority based channel access, and contention for channel access reinforce the energy-efficiency, reliability, bounded delay, and maximized throughput of the network.

TRACE is an energy-efficient dynamic TDMA protocol designed for real-time data broadcasting. In TRACE, data transmission takes place according to a dynamically updated transmission schedule. Initial access to data slots is through contention, but once a node reserves a data slot, its reservation for a data slot in the subsequent frames continues automatically as long as the node continues to broadcast a packet in each frame. Thus, nodes only need to contend for data slots at the beginning of data bursts.

A controller in the network is responsible for creating the TDMA schedule based on which nodes have continued reservations from previous frames and which have successfully contended for data slots in the current frame. The controller transmits this schedule to the rest of the nodes in the network at the beginning of the data sub-frame. Whenever the energy of the controller drops below the energy level of the other nodes in the network by more than a set amount, it assigns another radio with higher energy than itself as the next controller. Controller handover takes place during the TDMA schedule transmission by specifying the ID of the new controller. Finally, if the number of transmissions in a frame exceeds a predetermined threshold, each node listens only to data from certain other nodes. Each node determines which transmitters to listen to based on information obtained from all the nodes during the information summarization (IS) slot.

BRIEF DESCRIPTION OF THE DRAWINGS

A preferred embodiment of the invention will be set forth in detail with reference to the drawings, in which:

FIG. 5A shows the dropped packets per frame for the voice traffic of FIG. 4;

FIG. 5B shows the number of collisions per frame for the same traffic;

FIG. 6A shows the average number of dropped packets per frame as a function of the number of nodes in the network;

FIG. 6B shows the average value of the packet drop ratio as a function of the number of nodes in the network;

FIG. 7 shows average energy dissipation as a function of data traffic;

FIG. 8A shows a frame structure used for packet delay analysis;

FIG. 8B shows a probability density function of packet arrival time in the packet delay analysis;

FIG. 8C shows a probability density function of packet delivery time in the packet delay analysis;

FIG. 8D shows a probability density function of packet delay in the packet delay analysis;

DETAILED DESCRIPTION OF THE PREFERRED EMBODIMENT

A preferred embodiment of the present invention will be set forth in detail with reference to the drawings.

Figure 1:
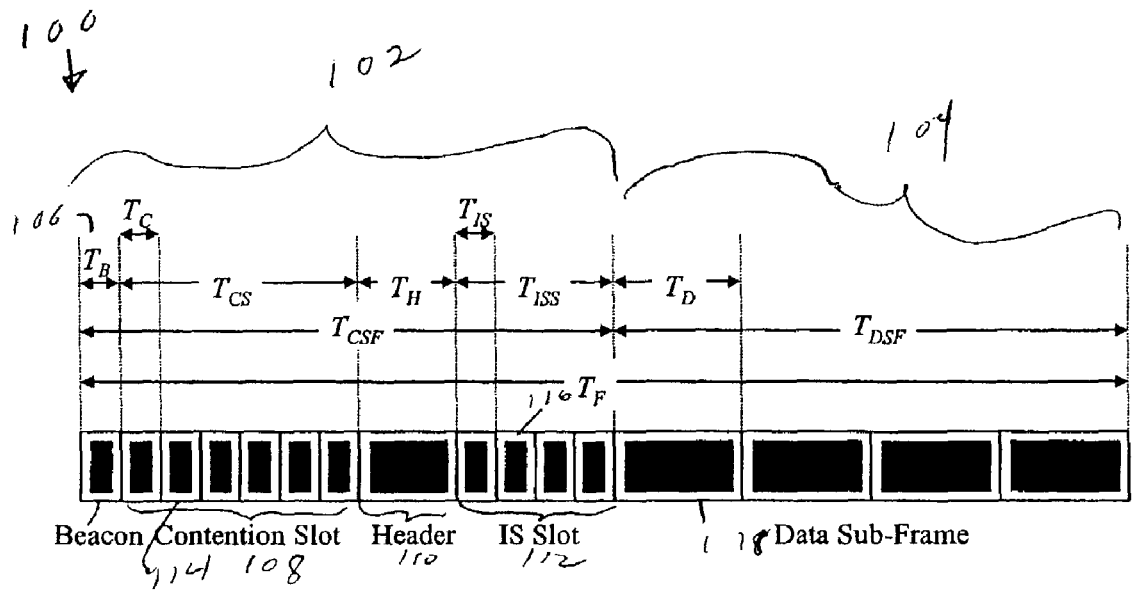
FIG. 1 shows a frame format used in the preferred embodiment.

TRACE is organized around time frames with duration matched to the periodic rate of voice packets. The frame format is presented in FIG. 1. Each frame 100 consists of two sub-frames: a control sub-frame 102 and a data sub-frame 104. The control sub-frame 102 consists of a beacon message 106, a contention slot 108, a header message 110, and an IS (information summarization) slot 112. The contention slot 108 has a plurality of subslots 114; similarly, the IS slot has a plurality of subslots 116. The data sub-frame 104 has a plurality of data slots 118

At the beginning of every frame, the controller node transmits a beacon message. This is used to synchronize all the nodes and to signal the start of a new frame. The contention slot, which immediately follows the beacon message, consists of $N_C$ sub-slots. Upon hearing the beacon, nodes that have data to send, but did not reserve data slots in the previous frame, randomly choose sub-slots to transmit their requests. If the contention is successful (i.e., no collisions), the controller grants a data slot to the contending node. The controller then sends the header, which includes the data transmission schedule of the current frame. The transmission schedule is a list of nodes that have been granted data slots in the current frame along with their data slot numbers. A contending node that does not hear its ID in the schedule understands that its contention was unsuccessful (i.e., a collision occurred or all the data slots are already in use) and contends again in the following frame. If the waiting time for a voice packet during contention for channel access exceeds the threshold, $T_{drop}$, it is dropped. The header also includes the ID of the controller for the next frame, which is determined by the current controller according to the node energy levels.

The IS slot begins just after the header slot and consists of $N_D$ sub-slots. Nodes that are scheduled to transmit in the data sub-frame transmit a short IS message exactly in the same order as specified by the data transmission schedule. An IS message includes the energy level of the transmitting node, enabling the controller node to monitor the energy level of the entire network, and the end-of-stream bit, which is set to one if the node has no data to send. Each receiving node records the received power level of the transmitting node and inserts this information into its IS table. The IS info table is used as a proximity metric for the nodes (i.e., the higher the received power the shorter the distance between transmitter and receiver nodes). Using the receive signal strength to estimate the relative distance of the transmitter to the receiver is a method employed in the prior art and will therefore not be described in detail here. If the number of transmissions in a particular frame is higher than a predetermined number of transmissions, $N_{max}$, each node schedules itself to wake up for the top Nm transmissions that are the closest transmitters to the node. Other methods of deciding which nodes to listen to can be used by changing what data the nodes send in the IS slot. Hence the network is softly partitioned into many virtual clusters based on the receivers; this is fundamentally different from transmitter based network partitioning.

The data sub-frame is broken into constant length data slots. Nodes listed in the schedule in the header transmit their data packets at their reserved data slots. Each node listens to at most $N_{max}$ data transmissions in a single frame; therefore each node is on for at most $N_{max}$ data slots. All nodes are in the sleep mode after the last reserved data slot until the beginning of the next frame.

If the power level of the controller node is lower than any other node by a predetermined threshold, then in the next frame controller handover takes place. The controller node assigns another node as the controller, effective with the reception of the header packet. Upon receiving the header packet, the node assigned to be the controller assumes the controller duties.

A node keeps a data slot once it is scheduled for transmission as long as it has data to send. A node that sets its end-of-stream bit to one because it has no more data to send will not be granted channel access in the next frame (i.e., it should contend to get a data slot once it has new data to send). Automatic renewal of data slot reservation enables real-time data streams to be uninterrupted.

Initial startup will now be described. At the initial startup stage, a node starts to listen to the medium to detect any ongoing transmissions for $T_F$, because it is possible that there might be an already operational network. If no transmission is detected, then the node picks a random time, smaller than $T_{CS}$, the contention slot duration, at which to transmit its own beacon signal, and begins to listen to the channel until its contention timer expires. If a beacon is heard in this period, then the node just stops its timer and starts normal operation. Otherwise when the timer expires, the node sends the beacon and assumes the controller position. In case there is a beacon collision, none of the colliding nodes will know it, but the other nodes hear the collision, so the initial setup continues. All the previously collided nodes, and the nodes that couldn't detect the collision(s) because of capture, will learn of the collisions with the first successful beacon transmission.

To avoid overwhelming the network, it is sometimes necessary to determine which nodes must be allowed to communicate and which nodes can be bumped. That determination is called prioritization. TRACE supports an optional prioritized operation mode. In this mode the nodes have three preassigned priority levels, of which Priority Level-1 (PL1) is the highest priority, and PL3 is the lowest priority. The highest level has the highest QoS (quality of service), and the lowest level has the lowest QoS. Prioritization is incorporated into the basic protocol operation at three points: contention, scheduling, and receiver based soft clustering.

In the contention stage, PL1, PL2, and PL3 nodes have numbers of non-overlapping contention slots given as $N_{C1}$, $N_{C2}$, and $N_{C3}$, respectively. $N_{Ci}$ (where i is the number of the priority level, which in this example is from 1 to 3) is chosen to satisfy $$\frac{N_{PL1}}{N_{C1}} < \frac{N_{PL2}}{N_{C2}} < \frac{N_{PL3}}{N_{C3}}, \quad (1)$$

where $N_{PLi}$ denotes the expected number of nodes in priority level i. The number of contention slots per node is higher in higher levels, which results in less contention for higher priority nodes.

In scheduling, PL1 and PL2 nodes are always given channel access, even if all the data slots are reserved. If all the data slots are reserved, then reservation of PL3 nodes are canceled starting from the latest reservation, and granted to the higher priority nodes. All the nodes should listen to data from PL1 nodes, whether or not they are close to the nodes. Prioritization does not affect the general protocol operation, because we assume that the number of PL 1 and PL2 nodes is much less than the number of PL3 nodes.

Another feature of the preferred embodiment is receiver-based soft cluster creation. Each node creates its receiver-based listening cluster, which has a maximum of $N_{max}$ members, by choosing the closest nodes based on the proximity information obtained from the received power from the transmissions in the IS slot. Priority has precedence over proximity; therefore, transmissions by PL1 nodes are always included in the listening cluster by removing the furthest node in the cluster. To avoid instantaneous changes in the listening clusters and to make them more stable, there is also a continuity rule: a member of the listening cluster cannot be excluded from the listening cluster until it finishes its talk spurt, which is a natural extension in the sense that if a speech stream is broken in the middle, the whole transmission becomes useless.

In case the controller node fails, the rest of the network should be able to compensate for this situation and should be able to continue its normal operation as fast and smooth as possible. Failure of the controller manifests itself at two possible points within a frame: Beacon transmission and header transmission. A backup controller, assigned by the controller, could listen for the beacon and header and become the controller whenever the controller fails. However, if both the backup controller and the controller die simultaneously, then the network is left dead. Instead of assigning a backup controller, there is a more natural and complete way of backing up the network: the transmission schedule is a perfect list of backup controllers in a hierarchical manner. The first node in the schedule is the first backup controller, the second node is the second controller, and the N'th node is the Nth backup controller.

The backup nodes listen to the beacon, which is a part of normal network operation. If the first backup controller does not hear the beacon for Inter Frame Space (IFS) time, then the controller is assumed dead and the beacon is transmitted by the first node. If the beacon is not transmitted for two IFS time then the second backup controller understands that both the controller and the first backup controller are dead, and transmits the beacon. The backup procedure works in the same way for all the nodes listed in the transmission schedule in the previous frame. If after (N+1) IFS time no beacon is transmitted, then the rest of the nodes understand that the controller and all the backup nodes are dead, and they restart the network. Restartup is the same as the initial network startup, but in this case nodes do not listen for an existing controller for $T_F$, instead they start right away, because they know the controller is dead and there is no need for waiting.

The response of the network to the controller failure in header transmission is very similar to that of beacon failure. The succeeding backup node transmits the transmission schedule of the previous frame by updating it with the information in the IS slot of the previous frame denoting nodes with reservations that no longer have data to transmit. However, none of the nodes, including the backup nodes, listen to the contention slot, so the transmission schedule cannot be updated for the contending nodes. This is not much of an issue in voice transmission, because packet loss due to delayed channel access causes the early packets to be dropped, which is preferable over packet loss in the middle of a conversation. Since controller node failure is not a frequent event, it is better not to dissipate extra energy on controller backup. If all the backup nodes die simultaneously during header transmission, then the rest of the nodes begin restartup. Also if there were no transmissions, then in case of a controller failure, nodes just enter restartup (i.e., there are no backup nodes).

To test the performance of TRACE, we conducted simulations using the ns software package. We simulated conversational voice coded at 32 Kbps. The channel rate is chosen as 1 Mbps. Each node listens to a maximum of 5 nodes. The transport agent used in the simulations is very similar to UDP, which is a best effort service. All the simulations, unless otherwise stated, are run for 100 s and averaged for 3 independent runs. Acronyms, descriptions and values of the parameters used in the simulations are presented in Table I.

TABLE I

Parameters used in the simulations.

| Acronym | Description | Value |
|---|---|---|
| $T_F$ | Frame duration | 25.0 ms |
| $T_{CSF}$ | Contention sub-frame duration | 3.8 ms |
| $T_{DSF}$ | Data sub-frame duration | 21.2 ms |
| $T_B$ | Beacon duration | 40.0 μs |
| $T_{CS}$ | Contention slot duration | 2.32 ms |
| $T_C$ | Contention sub slot duration | 40.0 μs |
| $T_H$ | Header duration | 0.44 ms (max) |

TABLE I-continued

Parameters used in the simulations.

| Acronym | Description | Value |
|---|---|---|
| $T_{ISS}$ | Information summarization slot duration | 1.0 ms |
| $T_{IS}$ | Information summarization sub-slot duration | 40 µs |
| $T_D$ | Data slot duration | 0.848 ms |
| IFS | Inter-frame space | 16.0 µs |
| $T_{drop}$ | Packet drop threshold | 50.0 ms |
| $N_D$ | Number of data slots | 25 |
| $N_C$ | Number of contention sub-slots | 58 |
| $N_{ci}$ | Number of contention sub-slots in priority i | 3, 5, 50 |
| $N_{max}$ | Maximum listening cluster size | 5 |
| $P_T$ | Transmit power | 0.6 W |
| $P_{TE}$ | Transmit electronics power | 0.318 W |
| $P_{PA}$ | Power amplifier power | 0.282 W |
| $P_R$ | Receive power | 0.3 W |
| $P_I$ | Idle power | 0.1 W |
| $P_S$ | Sleep power | 0.0 W |
| $m_s$ | Average spurt duration | 1.0 s |
| $m_g$ | Average gap duration | 1.35 s |

Frame time, $T_F$, is chosen to be 25 ms; of this, 21.2 ms is for the data sub-frame, DSF, and 3.8 ms is for the control sub-frame, CSF. There are 58 40 µs duration contention sub-slots, 25 40 µs duration IS sub-slots, and 25 848 µs duration data slots. Beacon, contention, and IS packets are all 3 bytes. The header packet has a variable length of 3-53 bytes, consisting of 3-byte packet header, and 2-byte data for each node to be scheduled. The data packet is 104 bytes long, consisting of 4 bytes of packet header and 100 bytes of data. Each slot or sub-slot includes 16 µsec of guard band (IFS) to account for switching time and round-trip time.

In voice source modeling we assume each node has a voice activity detector, which classifies speech into "spurts" and "gaps" (i.e., gaps are the silent moments during a conversation). During gaps no data packets are generated, and during spurts data packets are generated in the rate of the speech coder, which is 32 Kbps in our case. Both spurts and gaps are exponentially distributed statistically independent random variables, with means $m_s$ and $m_g$, respectively. In our simulations and analysis we used the experimentally verified values of $m_s$, and $m_g$, which are 1.0 s and 1.35 s, respectively.

For energy and propagation models, we used an energy model in which transmit power consists of a constant transmit electronics part, $P_{TE}$, and a variable power amplifier part, $P_{PA}$. Hence, the transmit power, PT, can be expressed as the sum of two terms:

$$P_T = P_{TE} + P_{PA}. \quad (2)$$

$P_{PA}$ should be adjusted to compensate for the path loss in wave propagation. The maximum distance between the nodes is 250 m in the scenarios we employed, and $P_{PA}$ is set to ensure that maximally separated nodes could hear each other's transmissions. Receive power, $P_R$, is dissipated entirely on receiver electronics. Idle power, $P_I$, is the power needed to run the electronic circuitry without any actual packet reception. In sleep mode, the radio is just shut down, so that sleep mode power, $P_S$, is very low.

A maximum of 25 nodes can transmit data simultaneously; therefore, the maximum achievable total throughput is 800 Kbps. However, it is not possible to reach this upper bound by keeping the QoS in acceptable limits. QoS in the context of voice traffic corresponds to the packet drop ratio, $R_{PD}$, due to the packet delay exceeding a certain maximum delay, $T_{drop}$ ($T_{drop}$=50 ms). $R_{PD}$ is the ratio of the average number of dropped voice packets per frame and the average number of voice packets generated per frame. However, since the voice signals are composed of spurts and gaps it is possible to support more than 25 users by multiplexing more than 25 conversational speech sources into 25 data slots.

Figure 2:
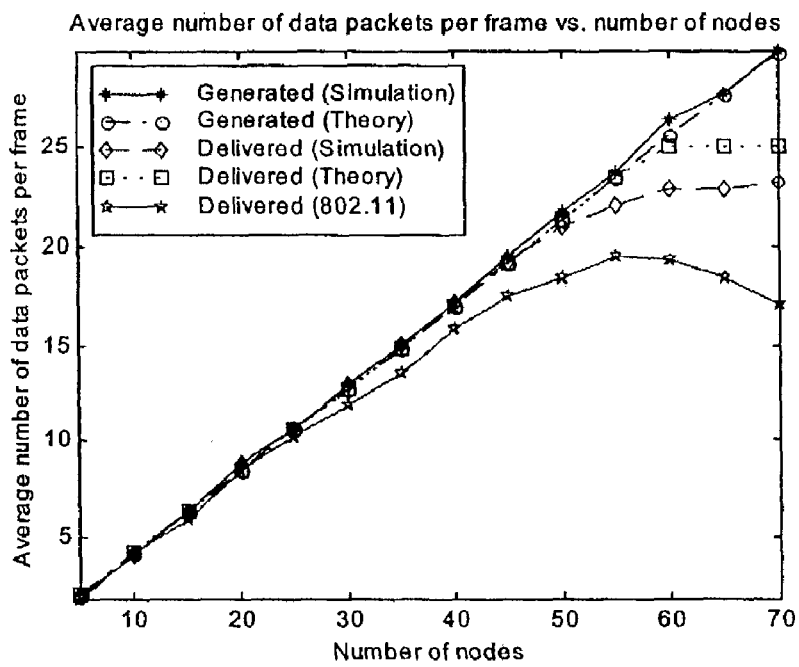
FIG. 2 shows an average number of data packets per frame as a function of total number of nodes with active voice sources.

FIG. 2 shows a plot of the average number of data packets generated per frame as a function of the number of nodes in the network. Theoretical value of the average number of data packets generated per frame, $N_G$, in a network of $N_N$ nodes is obtained as $$N_G = \frac{T_F}{m_s + m_g} N_N. \quad (3)$$

Both theoretical and simulation curves increase linearly almost with constant slope with $N_N$. All the simulation data points are within 3.0% error range of the theoretical curve, with a maximum difference of 0.85 packets per frame at $N_N$=60. FIG. 2 shows that the average number of voice packets generated per frame is 43% of the number of voice sources. It is possible to achieve a normalized capacity, η, of 2.32 conversations per channel with a perfect multiplexing of the voice sources over time. The normalized capacity is defined as the ratio of the maximum number of nodes (i.e., conversations) that can be supported without exceeding the packet drop ratio of 0.01 and the number of channels (data slots). However, the voice sources are independent (i.e., they are not coordinated, as the input pattern is not a design parameter) and it would be too optimistic to expect perfect statistical multiplexing.

The average number of packets delivered per frame, $N_A$, is obtained as:

$$N_A = \min\left[\frac{T_F}{m_s + m_g} N_N, N_{DS}\right], \quad (4)$$

where $N_{DS}$ is the total number of data slots in a frame. Curves showing the average number of delivered packets per frame obtained from the simulations and theory are in good agreement for $N_N$<50 (see FIG. 2). However, for $N_N \geq 50$ the difference between the curves is large (i.e., at $N_N$=60 the difference is 2.1 packets per frame). In theory we did not consider any packet drops, and assumed data packets are distributed evenly in all frames. In simulations, both of these assumptions are violated for $N_N$>50. For $N_N$>58, the average number of packets per frame exceeds the number of data slots; because of this in our theoretical model $N_A$=25, but we cannot achieve this upper bound in the simulations. This is because of the fact that in some frames the number of voice packets are smaller than 25, and in some others much higher than 25. Thus, due to the independent statistical behavior of the voice sources, it is not possible to achieve the upper bound without sacrificing the QoS (i.e., $R_{PD}$).

FIG. 2 also shows the number of data packets delivered per $T_F$ time for IEEE 802.11, which is lower than that of TRACE for all $N_N$. Maximum difference between TRACE and IEEE 802.11 is 6.1 packets per $T_F$ at $N_N$=70, which corresponds to a 26.2% decrease in throughput. For broadcast traffic IEEE 802.11 does not use the standard four-way handshake mechanism; instead only the data packet is transmitted, since no feedback can be obtained from the other nodes, and binary exponential backoff (BEB) is not employed for broadcast traffic. Thus IEEE 802.11 becomes Carrier Sense Multiple Access (CSMA) for broadcast traffic. The lower throughput of IEEE 802.11 than TRACE is due to the collisions, which arise because of the lack of coordination among the nodes (i.e., simultaneous transmissions result in collisions and none of the transmitting nodes are aware of the situation).

Figure 3:
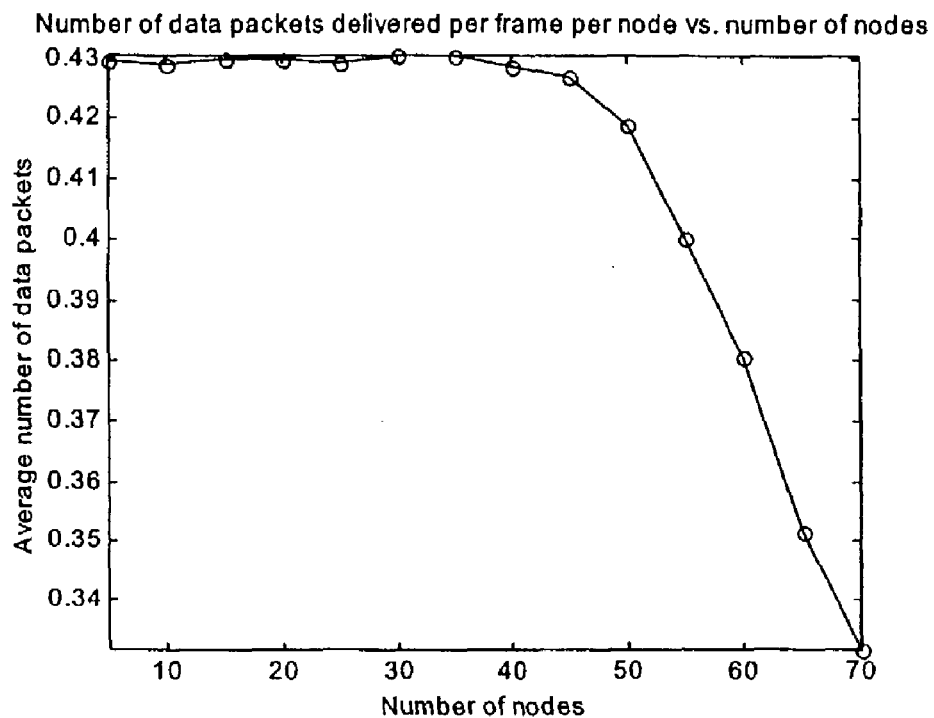
FIG. 3 shows an average number of data packets delivered per frame per node as a function of number of nodes.

FIG. 3 shows the average number of packets delivered per frame per node as a function of the number of nodes in the network. The nominal value of the average number of data packets delivered per frame per node is $m_s/(m_s+m_g)$. For $N_N<40$, the nominal value, 0.43, is preserved, but after that value, per node capacity starts to decrease exponentially. With the increasing number of data packets and in the absence of perfect multiplexing, the voice packets are not distributed evenly among the frames. Thus packets exceeding $T_{drop}$ are automatically dropped, which is the main contributor to the per node capacity decrease. However, for $N_N>58$, even if there were perfect multiplexing, the packet drops are unavoidable because after that point the average number of data packets per frame exceeds the number of data slots.

Figure 4:
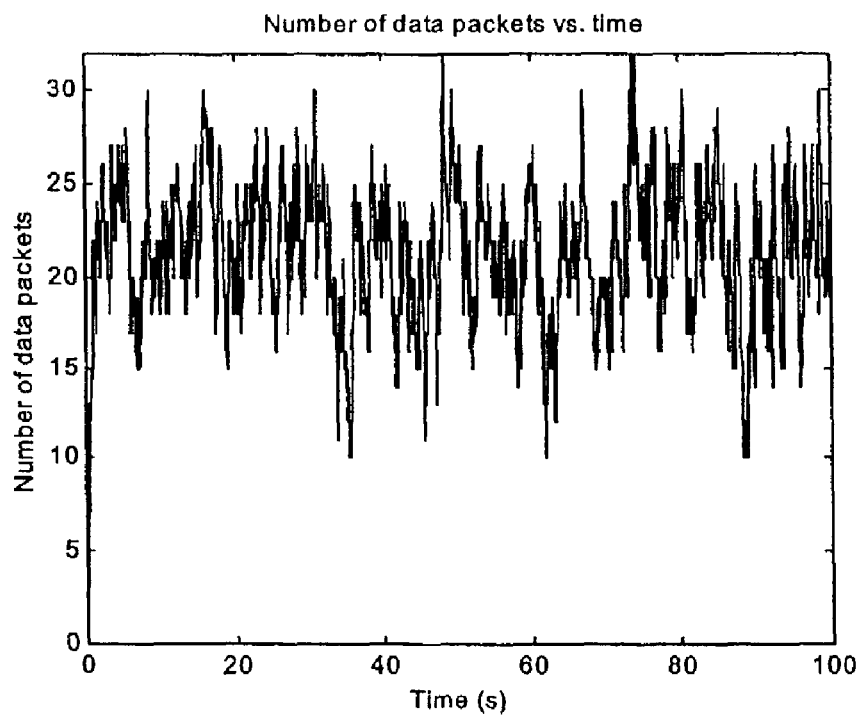
FIG. 4 shows a number of voice packets per frame as a function of time in a case in which the number of nodes in the network is 50 and the average number of packets sent per frame is 21.26.

FIG. 4 shows the number of voice packets generated per frame as a function of time for a 50-node network. The average number of voice packets per frame is 21.26. FIGS. 5A and 5B display the number of dropped packets per frame and the number of collisions per frame for the voice traffic shown in FIG. 4, respectively. The average number of dropped packets per frame and the average number of collisions per frame are 0.63 and 0.024, respectively.

FIGS. 6A and 6B show the average number of dropped packets per frame and $R_{PD}$ as functions of $N_N$, respectively. $R_{PD}$ increases exponentially for $N_N \geq 40$. In this range the actual number of nodes that simultaneously have voice packets to send frequently exceeds the number of data slots, so voice packets are dropped since it is not possible to grant permission to all nodes simultaneously.

The normalized capacity, $\eta$, of TRACE reaches 1.78 at $N_N=44$, whereas the $\eta$ of PRMA is reported as 1.16. It is also reported that at an optimal operating point the $\eta$ of PRMA reaches 1.64. However, there remains the problem of keeping the network in the optimal operating point. So the $\eta$ at the optimal case can be thought of as the upper bound for PRMA. There are several factors contributing to the difference between the $\eta$'s of PRMA and TRACE. The main factor in this difference is that the contention for channel access results in collisions and data slots cannot be used by either of the contenders in PRMA. However in TRACE since contention is not in the data slots, there is no loss of data slots because of contention. In addition, the number of contention slots is higher than the number of data slots, which further reduces the collisions. Another factor is that the $T_{drop}$ of PRMA is 20% lower than that of TRACE.

Channel bit rate for PRMA evaluation is 720 Kbps, which is entirely used by the nodes for uplink communications. We used a channel bit rate of 1 Mbps, which includes both uplink and downlink bandwidth and all the control packets. The bandwidth exclusively used for data transmissions and receptions is 848 Kbps.

The energy dissipation in the network is due to transmit, receive and idle modes of the radio and can be written as $$E = E_T + E_R + E_I, \quad (5)$$

where E, $E_T$, $E_R$ and $E_I$ are total energy dissipation, energy dissipated for transmission, energy dissipated for reception, and idle energy dissipation, respectively. All the energy values are the averages for single frame duration. Total transmit energy dissipation is given by $$E_T = E_B^T + E_C^T + E_H^T + E_{IS}^T + E_D^T, \quad (6)$$

where $E_B^T$, $E_C^T$, $E_H^T$, $E_{IS}^T$ and $E_D^T$ are beacon, contention, header, IS, and data transmission energy dissipations, respectively. Acronyms and descriptions of the variables are given in Table II:

TABLE II

Acronyms and descriptions of the variables in energy calculations.

| Acronym | Description |
| --- | --- |
| E | Total energy dissipation per frame |
| $E_T$ | Transmit energy dissipation per frame |
| $E_R$ | Receive energy dissipation per frame |
| $E_I$ | Idle mode energy dissipation per frame |
| $E_B^T$ | Energy dissipation for beacon transmission per frame |
| $E_C^T$ | Energy dissipation for contention transmission per frame |
| $E_H^T$ | Energy dissipation for header transmission per frame |
| $E_{IS}^T$ | Energy dissipation for IS Transmission per frame |
| $E_D^T$ | Energy dissipation for data transmission per frame |
| $E_B^R$ | Energy dissipation for beacon reception per frame |
| $E_C^R$ | Energy dissipation for contention reception per frame |
| $E_H^R$ | Energy dissipation for header reception per frame |
| $E_{IS}^R$ | Energy dissipation for IS reception per frame |
| $E_D^R$ | Energy dissipation for data reception per frame |

Energy dissipated for beacon transmission in terms of beacon duration, $T_B$, and transmit power, $P_T$, is given by $$E_B^T = T_B P_T. \quad (7)$$

Energy dissipation for contention is similar to beacon transmission, but the average number of contentions per frame is a statistical quantity. Let's define the average data burst duration, $T_{DB}$, which is the average length of a data burst (i.e., average duration of a speech burst, $m_s$), $T_S$, the average silence time between data bursts (i.e., average gap duration, $m_g$), $T_C$, the contention packet duration, $N_A$, the average number of data packets per frame, and, $T_F$, the frame duration. Using this notation, the contention energy dissipation per frame is given as $$E_C^T = N_A \frac{T_F}{T_{DB} + T_S} T_C P_T. \quad (8)$$

In the above equation we assumed all data bursts need to contend once to gain access to the channel (i.e., there are no collisions). This is a pretty good assumption, because the number of contention slots is large enough to avoid collisions, but there are still a small number of collisions, which does not affect our analysis significantly. The header is a variable length packet consisting of constant overhead and a variable payload that is a function of $N_A$:

$$E_H^T = T_H(N_A) P_T. \quad (9)$$

$T_H(N_A)$ is the duration of the header as a function of $N_A$:

$$T_H(N_A) = T_{OH} + N_A T_{DP}, \quad (10)$$

where $T_{OH}$ is the time spent for overhead and $T_{DP}$ is the time spent to schedule one data packet. Energy spent for IS transmission can be expressed in terms of $N_A$, $P_T$ and IS packet duration, $T_{IS}$:

$$E_{IS}^T = N_A T_{IS} P_T. \quad (11)$$

Energy dissipation for data transmission is similar to IS transmission:

$$E_D^T = N_A T_D P_T, \quad (12)$$

where $T_D$ is the duration of the data packet.

Energy dissipated for data reception can be decomposed into beacon reception, $E_B^R$, contention reception, $E_C^R$, header reception, $E_H^R$, IS reception, $E_{IS}^R$, and data reception, $E_D^R$, components; hence, the total receive energy dissipation is $$E_R = +E_B^R + E_C^R + E_H^R + E_{IS}^R + E_D^R. \quad (13)$$

All the nodes, except the controller, receive the beacon at the beginning of each frame, independent of data traffic. Energy dissipated for beacon reception can be written in terms of the number of nodes in the network, $N_N$, the time for the beacon, $T_B$ and the receive power, $P_R$, $$E_B^R = (N_N - 1) T_B P_R. \quad (14)$$

Contention packets are received by the controller only. Thus the expression for contention reception energy dissipation is the same as the contention transmission, except in this case we use $P_R$ instead of $P_T$.

$$E_C^R = N_A \frac{T_F}{T_{DB} + T_S} T_C P_R. \quad (15)$$

Energy dissipation for header reception is $$E_H^R = (N_N - 1) T_H(N_A) P_R. \quad (16)$$

IS packets have constant duration, $T_{IS}$, and they are received by all nodes, and transmitted by all nodes that are scheduled to transmit data. Thus the energy to receive IS packets is:

$$E_{IS}^R = (N_N - 1) N_A T_{IS} P_R. \quad (17)$$

All the nodes in the network listen to a maximum of $N_{max}$ transmissions; in a situation where $N_A$ is smaller than $N_{max}$, then only $N_A$ transmissions are received. Therefore, data reception energy dissipation is $$E_D^R = N_N \min(N_{max}, N_A) T_D P_R. \quad (18)$$

Idle energy dissipation is mainly dominated by the controller. The controller is on for the whole contention slot, which is transmission free for most of the time. The idle energy expression in terms of idle power, $P_I$, total contention slot length, $T_{CS}$, and the other previously defined parameters is $$E_I = \left(T_{CS} - N_A \frac{T_F}{T_{DB} + T_S} T_C\right) P_I. \quad (19)$$

FIG. 7 shows a plot of the total network energy dissipation per frame for different values of $N_N$. Theoretical analysis and simulation results are in good agreement, with a maximum difference of 4.0 mJ (3.7%) when $N_N$=60. The difference is arising due to the overestimation of $N_A$. In theory we did not consider the packet dropping probability; however starting with $N_N$=40, there is a non-zero packet dropping probability. Nonetheless, the energy mismatch between the theory and simulation is still small (3.7% max.). The theoretical minimum energy is the energy needed to transmit and receive data only. We assume an omniscient network coordinator takes care of network coordination and informs the nodes without dissipating any energy. The maximum difference between the theoretical minimum and simulation is 19.6 mJ (15.8%) at $N_N$=70. All the energy above the theoretical minimum energy is spent for control packets and network monitoring. Energy dissipation without the IS slot is much higher than the actual energy dissipation, because all the nodes should be listening to all data transmissions, forwarding the desired packets to the upper layer and discarding the rest, which results in extra power dissipation for unnecessary but also inevitable information reception in the absence of the IS slot. The maximum difference between the case without the IS slot and the actual case is 335 mJ, which corresponds to a 269% increase in energy dissipation. Thus using a data summarization slot like IS is very helpful in reducing energy dissipation.

IEEE 802.11 has 52 bytes of packet header in broadcast packets in standard operation, whereas TRACE has only 4 bytes of data packet header. In order to compare these two protocols on a fair basis, we reduced the header size for IEEE 802.11 to 4 bytes, so the data packet size is 104 bytes for both TRACE and IEEE 802.11 in our simulations. FIG. 7 shows that energy dissipation for IEEE 802.11 is higher than all the other cases for all $N_N$, because in standard IEEE 802.11 operation all the nodes in the network are always on and all the broadcast packets are received without any discrimination. Maximum difference between TRACE and IEEE 802.11 energy dissipation curves is 349 mJ (281% increase in energy dissipation) at $N_N$=70. Energy dissipation for IEEE 802.11 is higher than that of the case without IS slots because in IEEE 802.11 none of the nodes goes to sleep mode, whereas in the case without IS slot nodes go to sleep mode if the network is idle.

Packet delay will now be discussed. The arrival time of a voice packet is uniformly distributed to one frame time. It is not possible for a packet to arrive and be delivered in the same frame; the earliest delivery can be in the next frame. The delivery time is a uniform discrete random variable, because packets can be delivered only at the end of each data slot, and no data slot has precedence over others.

The frames structure used for the packet delay analysis is shown in FIG. 8A. Random variables x and y, which are shown in FIGS. 8B and 8C, represent the packet arrival time and the packet delivery time, respectively. The probability density function (pdf) of x, the packet arrival time, is given as $$f_x(x) = \begin{cases} 1/T_F, & 0 < x \le T_F \\ 0, & \text{otherwise} \end{cases} \quad (20)$$

The pdf of the delivery time, y, is $$f_y(y) = \frac{1}{N_A} \sum_{k=1}^{N_A} \delta(y - T_{CSF} + kT_D), \quad (21)$$

where $T_{CSF}$ is the control subframe duration and $\delta(.)$ is the Dirac delta function.

We can find the delay by subtracting x from y, but we must add an offset of $T_F$ to y in order to define both variables according to beginning of frame 1 (i.e., y=0 corresponds to y=$T_F$). The delay is given by $$z = T_F + y - x. \quad (22)$$

Since x is a uniform random variable between 0 and $T_F$, $T_F-x$ is equivalent to x, so $$z = y + x. \quad (23)$$

The pdf of z, shown in FIG. 8D, is obtained by convolving x and y:

$$f_z(z) = f_x(x) \circledast f_y(y), \quad (24)$$

$$f_z(z) = \frac{1}{N_A T_F} \sum_{k=1}^{N_A} \{u(z - (T_{CSF} + kT_D)) - u(z - (T_F + T_{CSF} + (N_A + 1 - k)T_D))\}, \quad (25)$$

where u(.) denotes the unit step function. The expected value of z is obtained as $$E[z] = 0.5(T_F + 2T_{CSF} + (N_A+1)T_D). \quad (26)$$

Figure 9:
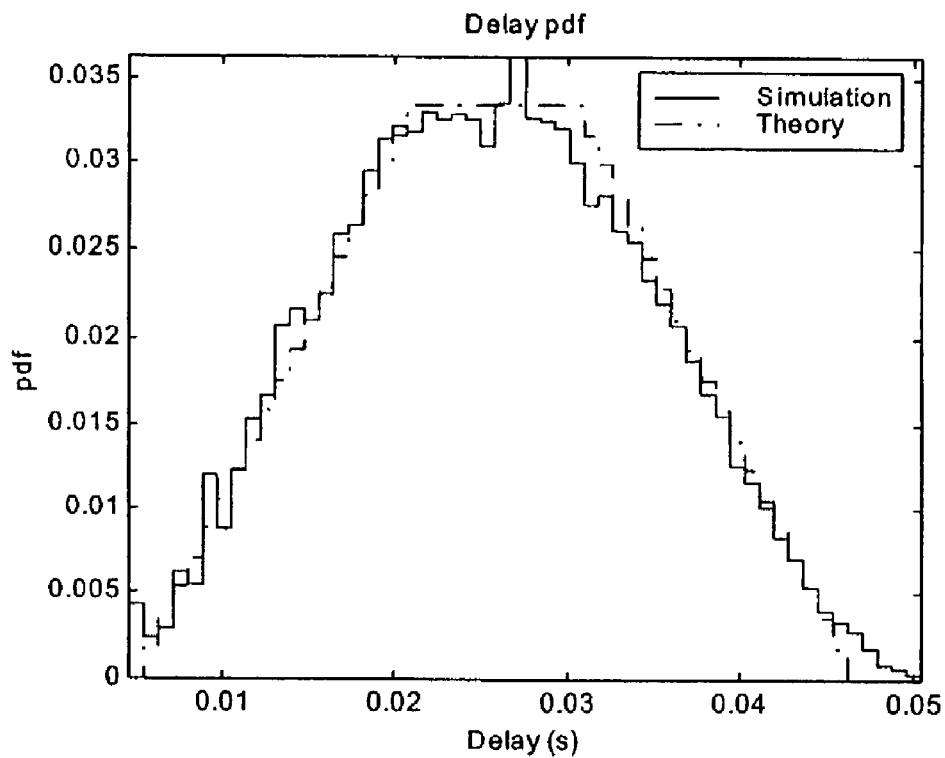
FIG. 9 shows probability density functions of packet delay with fifty nodes in simulation and theory.
Figure 10:
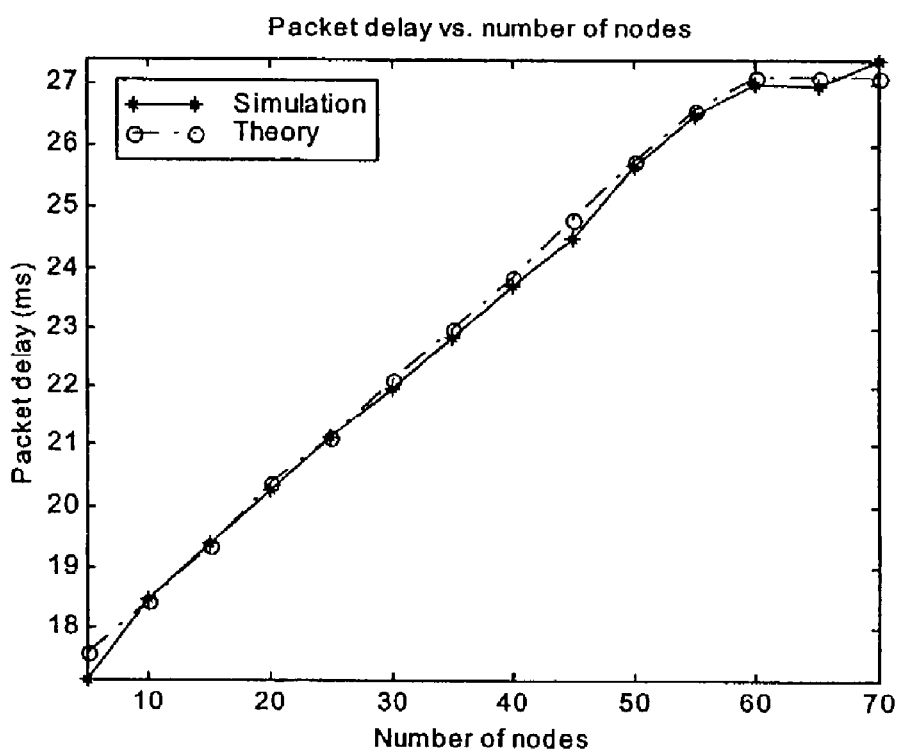
FIG. 10 shows packet delay as a function of the number of nodes.

FIG. 9 shows a plot of the pdf's obtained from simulation and theory. Root mean square (RMS) error between the two curves is less than 0.2%. FIG. 10 shows a plot of the average packet delay versus the number of nodes. The maximum difference between the simulation data and theory is 0.26 ms at $N_N=70$, which corresponds to a 1.0% difference.

To test the automatic control backup scheme, we designed a random controller failure simulation. In the simulation the controller can fail with a probability p at each frame. This corresponds to an exponentially decreasing non-failure probability in time, which is shown to be a valid model for wireless radios [18]. Let u be the random variable that represents the non-failure for the controller at k'th beacon transmission and define q=1−p to be the probability of nonfailure. The pdf of u is $$f_u(k) = \left(\frac{1}{1-q} - 1\right) q^k. \quad (27)$$

The first term is the normalization term to make the area of the pdf unity; the second term states that the probability of non-failure decreases exponentially. The expected value of u is $$\mu = \left(\frac{1}{1-q} - 1\right) \sum_{k=0}^{\infty} k q^k. \quad (28)$$

This gives the average lifetime (i.e., failure time) of a network without any backup mechanism and with a controller non-failure probability of q. The expected lifetime of a network having a backup mechanism with N nodes, $\mu_N$, is given by $$\mu_N = N\mu. \quad (29)$$

Figure 11:
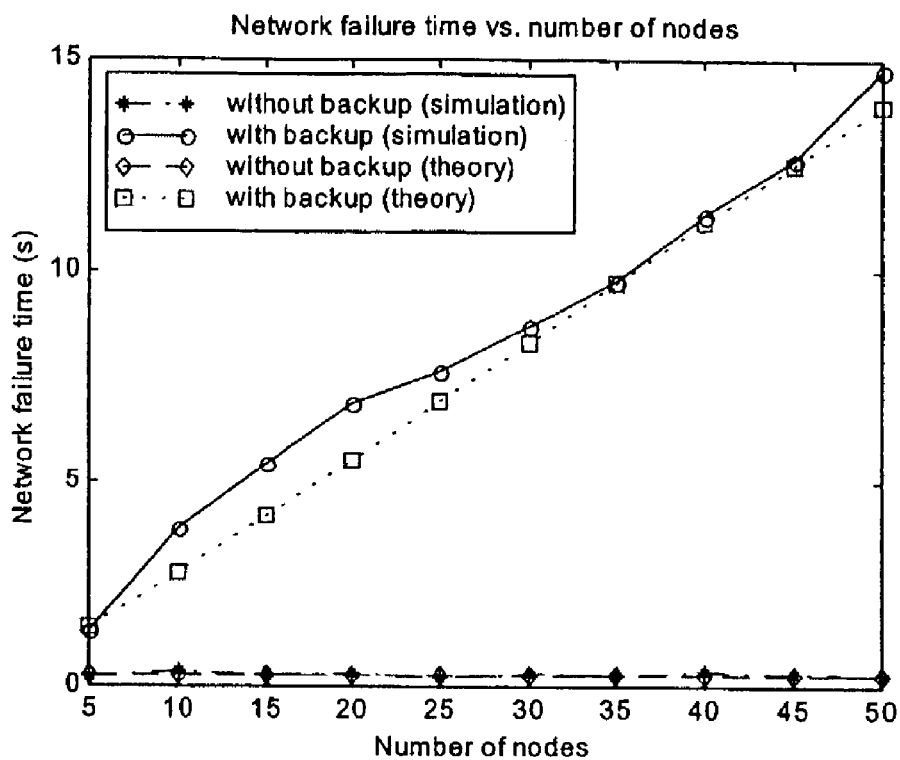
FIG. 11 shows network failure time as a function of the number of nodes.

Network lifetime curves obtained from simulations and theory with p=0.1 are plotted in FIG. 11. Simulations are averaged over 10 statistically independent simulation runs. The average network lifetime without backup is 0.2824 s and 0.2778 s for the simulation and theory, respectively. The average network lifetime with backup elongates the network failure time directly proportional with the number of nodes in the network. Network lifetime increases 50 times for a 50-node network theoretically. The increase in network lifetime in the simulations is 52.4, on the average for a 50-node network.

Figure 12:
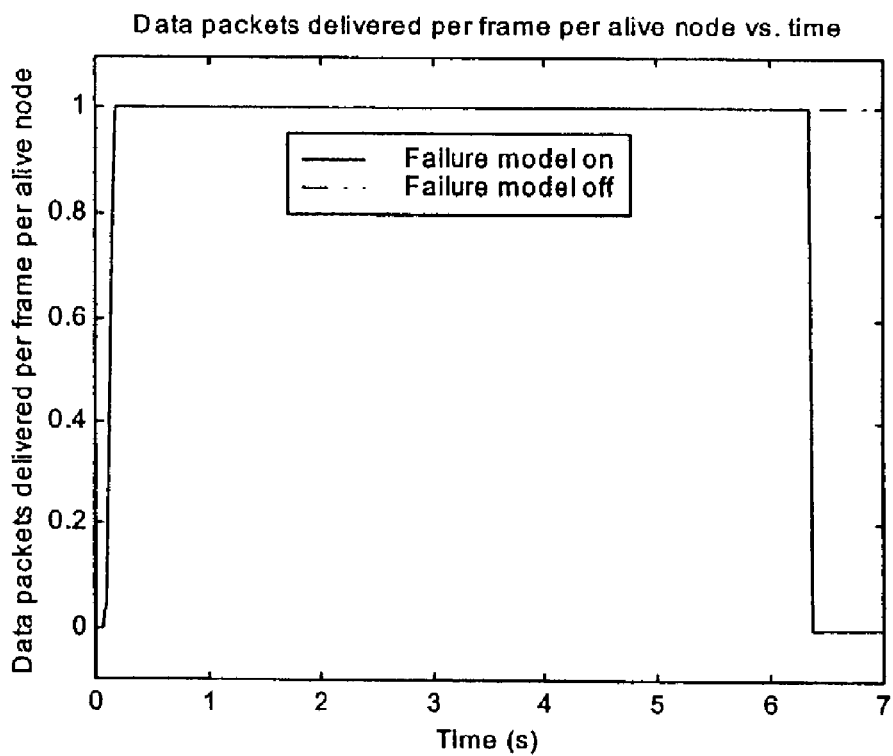
FIG. 12 shows delivered voice packets per frame per alive node as a function of time.

One of the design goals in the controller failure monitoring and compensation is to enable the network to resume its normal operation in an uninterrupted manner. We found that the data packet per frame per node is an appropriate metric to test the continuity of the normal network operation (i.e., since the nodes keep dying, the total number of nodes and consequently the number of transmitted data packets are reduced proportional to this decrease in the number of alive nodes). We also set $m_g=0$, so that each alive node in the network has a data packet at each frame and the statistical behavior of the voice source does not interfere with our metric (i.e., as an alive node might not have data to send in the actual voice model in all frames, then it would not be possible to quantify the behavior of the network correctly). In FIG. 12 we present curves showing the average number of data packets per frame per node as a function of time for a 20 node network assuming no node failures (dashed line) and for the same network with node failures and the backup mechanism turned on (solid line). Data per frame per node is equal to unity for both curves for the whole simulation time during which there is at least one alive node left for the case with node failures (i.e., t<6.4 s), which shows that the backup mechanism can effectively compensate the controller failure, and until all the nodes die the network continues to operate with minimal interruption in service.

Figure 13:
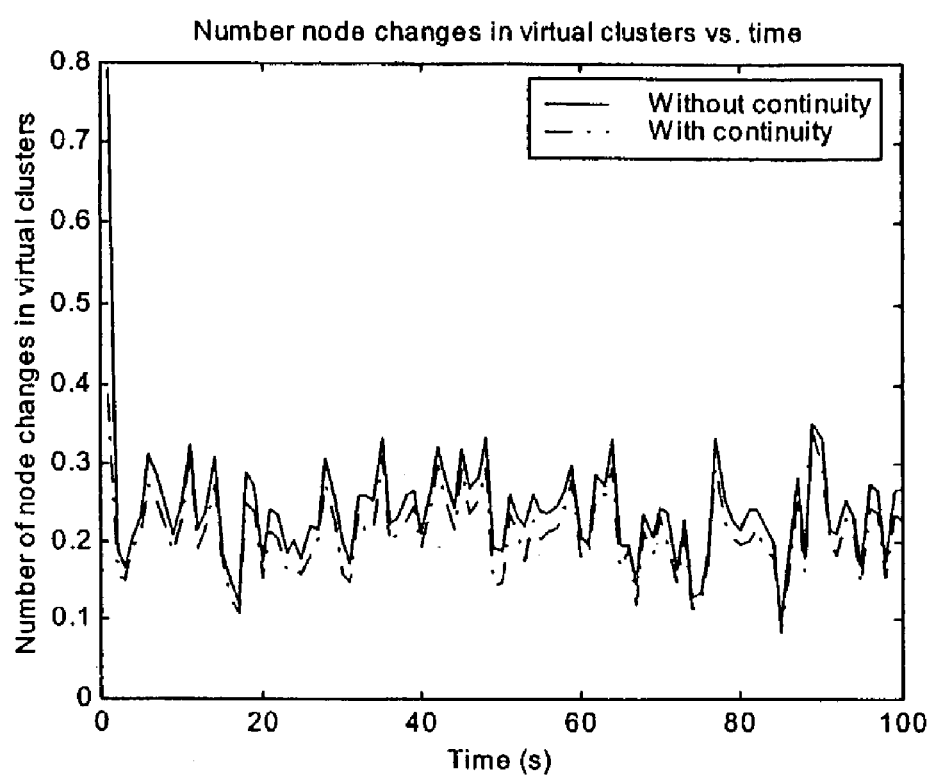
FIG. 13 shows an average number of node changes in listening clusters per node per frame as a function of time.

FIG. 13 shows a plot of the number of node changes in the virtual clusters per node per frame with and without the continuity rule for a 50-node network. The differences between the curves arise due to the fact that without the continuity rule a continuing voice stream is dropped because a closer voice source starts to transmit its voice packets. The total number of changes in the virtual clusters without the continuity rule is 48639, whereas it is 42813 with the continuity rule, which shows a 12% reduction in the total number of changes. In other words, 5826 voice burst interruptions are prevented from happening by applying the continuity rule.

In the simulations, almost all the dropped data packets are from PL3 nodes. There were very few dropped packets at PL1 or PL2 nodes, and very few collisions of contention packets from these nodes. As long as the number of voice packets is below the number of data slots for a particular frame, the number of collisions and the number of packet drops are virtually zero. The $R_{PD}$ is non-zero for $N_N \geq 40$ (FIG. 6) because of the fact that nodes attempting to get channel access are unable to get access for several frames due to temporary overload. Nodes that cannot obtain channel access continue contention until they get channel access, which results in an increased number of contending nodes, and more collisions. This also explains why there are very few packet drops for PL1 and PL2 nodes: since there is no congestion for high priority nodes, they get channel access in a single attempt, and the number of contending nodes do not increase even in overloaded traffic. Statistical multiplexing of voice packets is good enough to ensure high QoS for high priority nodes; i.e., if all the high priority nodes try to get channel access at the same frame, there would be a non-negligible collision probability. Since we observed only a few collisions, we conclude that statistical multiplexing is good enough to avoid collisions for high priority nodes. For low priority nodes, there is not much contention except for overloaded traffic frames, which also reinforces our observation about the statistical multiplexing of voice packets.

Figure 14:
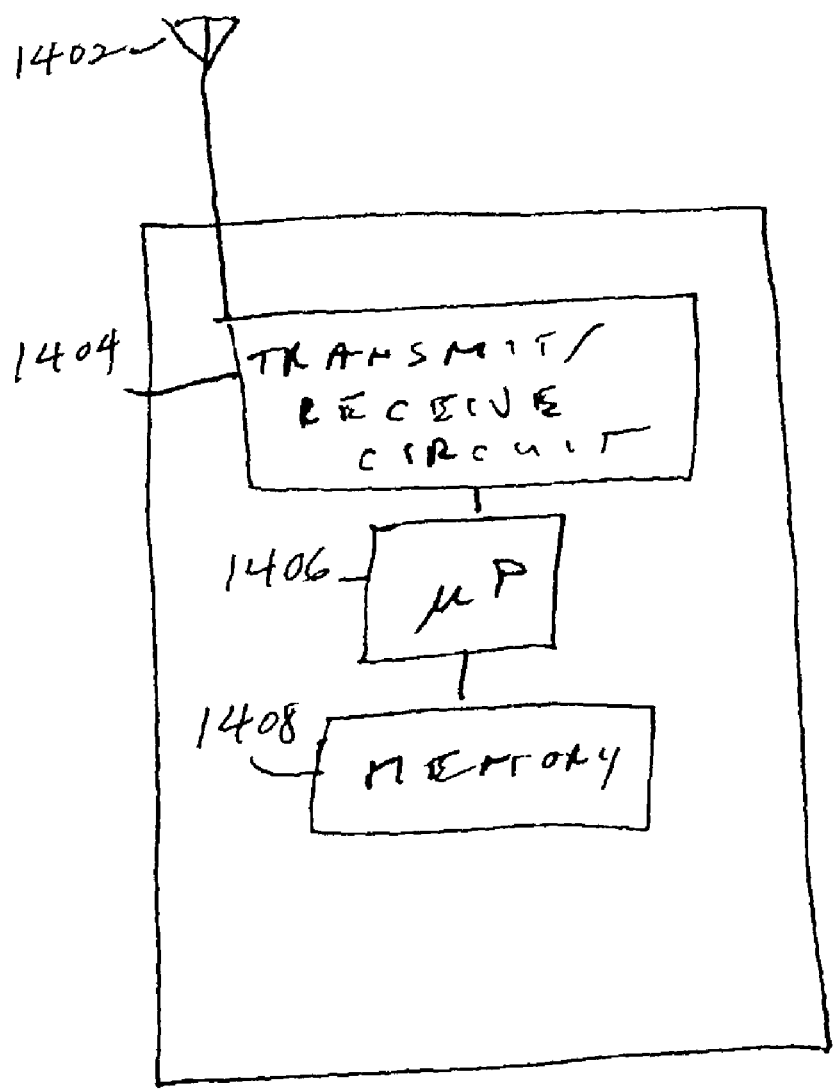
FIG. 14 shows a block diagram of a node for which the preferred embodiment can be implemented.

In TRACE, each node contains the functionality to perform the operations described above, either as a controller node or as merely a node as required. A block diagram of a radio device capable of functioning as a TRACE node is shown in FIG. 14. The radio device 1400 includes an antenna 1402 and circuitry 1404 for transmitting and receiving under the control of a processor 1406. A non-volatile memory 1408 includes the software for permitting the processor 1406 to perform the required operations. Of course, other components can be included, based on the sort of network to be implemented, e.g., equipment for a voice network, a video/voice network, etc.

TRACE is an appropriate MAC protocol to fulfill the tactical communication requirements of a small to medium size military group (i.e., a squad) or a law enforcement group (i.e., police officers pursuing a criminal or airport security personnel searching a group of passengers). A group of researchers, students or tourists having a field trip may also use TRACE-based networks. An interesting application that fits very well to a TRACE-based network is communication among a group of hearing disabled people who communicate with sign language. Since vision is the only possible means of communication for such a group, without direct vision (i.e., you cannot see simultaneously a person at your left and another at your right), it is not possible to have group communication in all situations. If each person has a PDA with a small camera and a low-resolution monitor large enough to display the signs, possibly with several panels, and an MPEG coder, which enables high compression, then it is possible to create a communication network for hearing disabled people.

In the simulations we assumed that all the nodes in the network are active voice sources and independent of each other to demonstrate the worst-case performance of TRACE; however, it is unlikely in a realistic scenario that everybody is speaking without listening to others. Therefore, it is possible to support a higher number of nodes with the same packet drop rate in a realistic scenario. Energy dissipation per node will also be lower if not all the nodes are active. There will not be any change in packet delay characteristics, because silent nodes are just passive participants in the network.

Capture is a factor that affects the fairness of PRMA and all other ALOHA family protocols. Indeed a strong capture mechanism increases the throughput of PRMA, because of the fact that most of the contention attempts result in favor of the node close to the base station. Instead of loosing both packets and wasting the whole data slot, only one of the nodes looses the contention and the other captures the channel, which increases the total throughput and degrades the fairness among the nodes in an uncontrolled manner (i.e., unlike the prioritization in TRACE, which is a controllable design parameter). The effects of capture in TRACE are only marginal (i.e., the only possible scenario that we can think of is that there is only one data slot left and there are two nodes that are contending for channel access and decide to send their contention requests at the same contention slot. The node that is closer to the controller captures the channel, and the last data slot is reserved for this node.).

The IS slot contributes significantly to the efficiency of TRACE. The end-of-stream information is included in the IS slot, because it is the most appropriate point in the frame structure for this information. A node does not know whether it has a voice packet or not in the next frame during its data transmission because the packet generation rate is matched to the frame rate, so end-of-stream information cannot be sent in the data slot. The earliest point where a node knows it is out of packets is during the control sub-frame. If the end-of-stream information is not sent in the IS slot but in the data slot (i.e., no data is sent to indicate the end-of-stream like in PRMA) then the controller should be listening to all the data slots to monitor for the continued use of data slots, which results in waste of considerable energy.

In our current implementation, the information for data discrimination is proximity; however, the information in the IS slot can be modified for different applications. For example, the IS slot can be used to send metadata describing the data that will be transmitted in the corresponding data slot. The nodes can choose which transmitters to listen to based on this metadata.

Priority levels of TRACE might be used to support various requirements of the applications using TRACE as the MAC layer. For example, in a military operation, it is necessary that the commander have priority over other soldiers and everybody listen to the commander's speech (PL1), and the leaders of each sub-squad should also have a priority lower than that of the commander (PL2) but higher than the others (PL3). In a multimedia application PL 1 and PL2 could be thought of as constant bit rate (CBR) sources and PL3 as a variable bit rate (VBR) or available bit rate (ABR) source. In a field trip, the tour guide can be a PL1 node, and the rest can be PL3 nodes.

TRACE does not have a global synchronization requirement. Each node updates the frame start time by listening to the beacon sent by the controller, and all the transmissions and receptions are defined with respect to this time, which is updated at each frame by the controller.

Two features of TRACE make it an energy efficient protocol: (i) scheduling and (ii) receiver based listening cluster creation via IS slot. Network lifetime is maximized in TRACE using dynamic coordinator switching and automatic backup mechanisms. Separation of the contention and data transmission is the determining factor in high throughput, low delay and stability under a very wide range of data traffic. Different QoS levels are also supported in TRACE via priority levels.

All of the above features are quantified through simulations and analytical models. It is shown that TRACE has better energy saving and throughput performance than PRMA and IEEE 802.11. Our future research will concentrate on extending TRACE to multi-hop networks.

TRACE is described in B. Tavli and W. B. Heinzelman, "TRACE: Time Reservation Using Adaptive Control for Energy Efficiency," accepted for publication in *IEEE J. Select. Areas Comm.*, 2002, whose disclosure is hereby incorporated by reference in its entirety into the present disclosure.

While a preferred embodiment of the present invention has been set forth above, those skilled in the art who have reviewed the present disclosure will readily appreciate that other embodiments can be realized within the scope of the invention. For instance, any suitable transmission medium can be used. Also, as already noted, communication techniques other than voice can be supported. Further, numerical values are illustrative rather than limiting. Therefore, the present invention should be construed as limited only by the appended claims.

We claim:

1. A method for transmitting information in a network having a plurality of nodes, one of which is a controller node, the method comprising:

(a) dividing time into frames, each frame comprising (i) a beacon slot for sending a beacon, (ii) a plurality of contention slots for sending requests for data slots, (iii) a header slot for sending a header which comprises a transmission schedule for the frame, (iv) a plurality of information summarization slots for sending summaries of the information, and (v) a plurality of data slots, each for data transmission by one of the nodes;

(b) permitting each of the plurality of nodes to reserve one of the plurality of data slots by sending the requests in the contention slots;

(c) maintaining a reservation of each of the plurality of data slots which is reserved by one of the plurality of nodes until said one of the plurality of nodes indicates that it has stopped transmitting;

(d) sending the header from the controller node, the transmission schedule in the header indicating the reservations; and (e) sending the information from the nodes in accordance with the transmission schedule;

wherein when the controller node fails, another node becomes the controller node and operates as the controller node using the transmission schedule; and wherein the transmission schedule is used as a list of backup nodes in hierarchical order.

2. A method for transmitting information in a network having a plurality of nodes, one of which is a controller node, the method comprising:

(a) dividing time into frames, each frame comprising (i) a beacon slot for sending a beacon, (ii) a plurality of contention slots for sending requests for data slots, (iii) a header slot for sending a header which comprises a transmission schedule for the frame, (iv) a plurality of information summarization slots for sending summaries of the information, and (v) a plurality of data slots, each for data transmission by one of the nodes;

(b) permitting each of the plurality of nodes to reserve one of the plurality of data slots by sending the requests in the contention slots;

(c) maintaining a reservation of each of the plurality of data slots which is reserved by one of the plurality of nodes until said one of the plurality of nodes indicates that it has stopped transmitting;

(d) sending the header from the controller node, the transmission schedule in the header indicating the reservations; and (e) sending the information from the nodes in accordance with the transmission schedule;

wherein:

each node sends an information summarization packet during a corresponding one of the information summarization slots;

each node indicates that it has stopped transmitting by sending an end-of-transmission bit in its information summarization packet;

each node records a power level of the information summarization packet sent by each of a plurality of other nodes to determine a listening cluster of nodes based at least partially on proximity; and said each node listens to the nodes in the listening cluster.

3. The method of claim 2, wherein:

each node receives the information summarization packets sent by the nodes in its listening cluster, determines in accordance with the information summarization packets which information it wishes to receive, and listens only to the nodes sending the information that it wishes to receive.

4. A method for transmitting information in a network having a plurality of nodes, one of which is a controller node, the method comprising:

(a) dividing time into frames, each frame comprising (i) a beacon slot for sending a beacon, (ii) a plurality of contention slots for sending requests for data slots, (iii) a header slot for sending a header which comprises a transmission schedule for the frame, (iv) a plurality of information summarization slots for sending summaries of the information, and (v) a plurality of data slots, each for data transmission by one of the nodes;

(b) permitting each of the plurality of nodes to reserve one of the plurality of data slots by sending the requests in the contention slots;

(c) maintaining a reservation of each of the plurality of data slots which is reserved by one of the plurality of nodes until said one of the plurality of nodes indicates that it has stopped transmitting;

(d) sending the header from the controller node, the transmission schedule in the header indicating the reservations; and (e) sending the information from the nodes in accordance with the transmission schedule;

wherein, at startup:

a node listens for transmissions during a predetermined time period;

if the transmissions are not detected during the predetermined time period, the node selects a random time at which to transmit its own beacon;

if, within the random time, the node hears the beacon from another node, the node starts normal operation;

if, within the random time, the node does not hear the beacon from another node, the node transmits the beacon and functions as the controller node; and if there is a collision among beacons, and if the node failed to detect the collision because the node was one of the colliding nodes or because of capture, the node detects the collision from a successful header transmission.

5. A device for operating as a node in a network having a plurality of nodes, one of which is a controller node, the network dividing time into frames, each frame comprising (i) a beacon slot for sending a beacon, (ii) a plurality of contention slots for sending requests for data slots, (iii) a header slot for sending a header which comprises a transmission schedule for the frame, (iv) a plurality of information summarization slots for sending summaries of the information, and (v) a plurality of data slots, each for data transmission by one of the nodes, the device comprising:

a communication component for communicating with a plurality of other devices within the network; and a processor, operatively connected to the communication component, for controlling an operation of the communication component such that the device performs the following operational steps:

(a) permitting the node to reserve one of the plurality of data slots by sending the request in one of the contention slots;

(b) if the request is granted, maintaining a reservation of one of the plurality of data slots until the reservation is no longer needed, and setting an end-of-stream bit in a packet in a corresponding information summarization slot indicating that the reservation is no longer needed;

(c) receiving the header from the controller node, the transmission schedule in the header indicating the reservations; and (d) sending the information in accordance with the transmission schedule;

wherein, at startup, the processor further controls the communication component to perform the following operational steps:

(e) listening for transmissions during a predetermined time period;

(f) if the transmissions are not detected during the predetermined time period, selecting a random time at which to transmit its own beacon;

(g) if, within the random time, the device hears the beacon from another node, starting normal operation;

(h) if, within the random time, the device does not hear the beacon from another node, transmitting the beacon and functions as the controller node; and (i) if step (f) resulted in a collision among beacons, and if the node failed to detect the collision because the node was one of the colliding nodes or because of capture, detecting the collision from a successful header transmission.

* * * * *